F. GEMINDEN & F. KIEL.
THRESHER OR SEPARATOR.
APPLICATION FILED JAN. 14, 1916.
1,229,063.
Patented June 5, 1917.
5 SHEETS—SHEET 1.
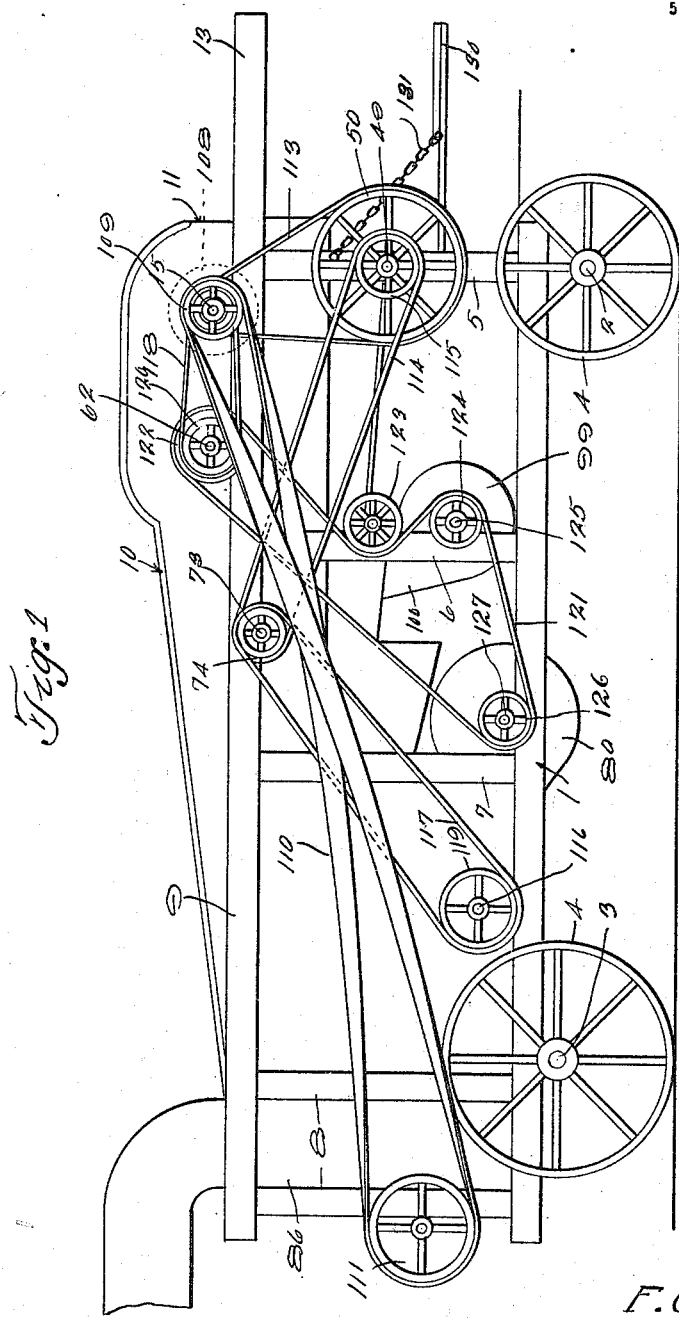
Witnesses
Chas. H. Trotte.
Robt Meyer
Inventors
F. Geminden
& F. Kiel
By
Attorney

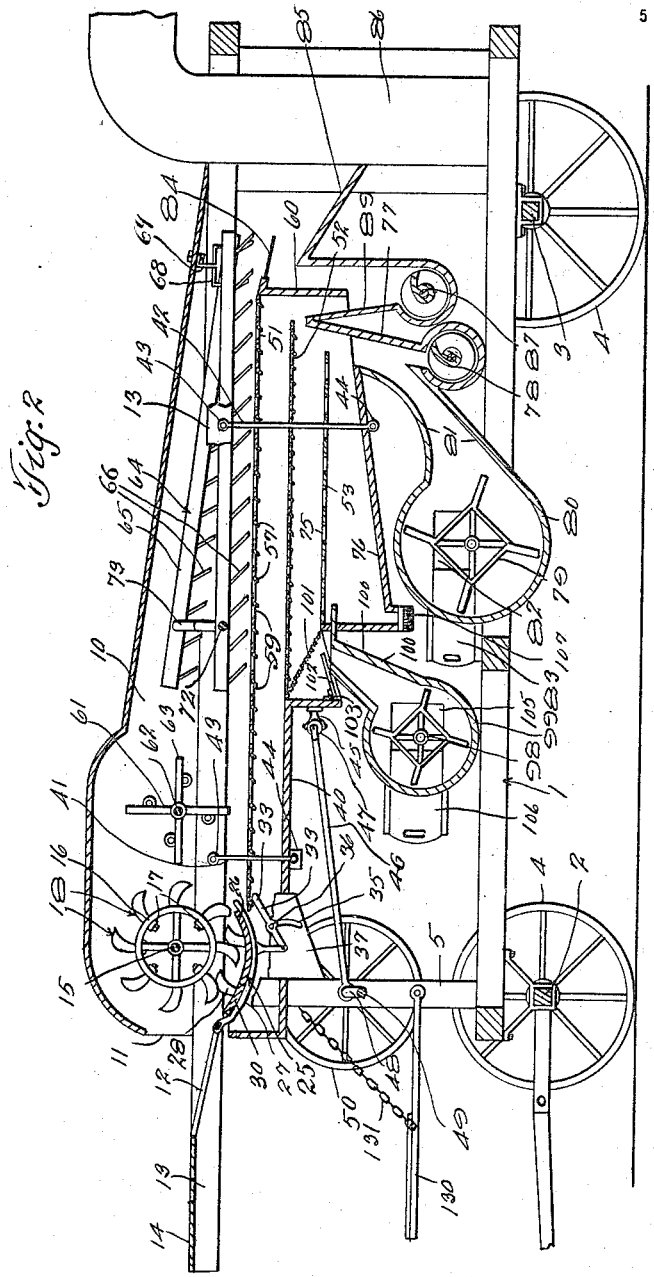

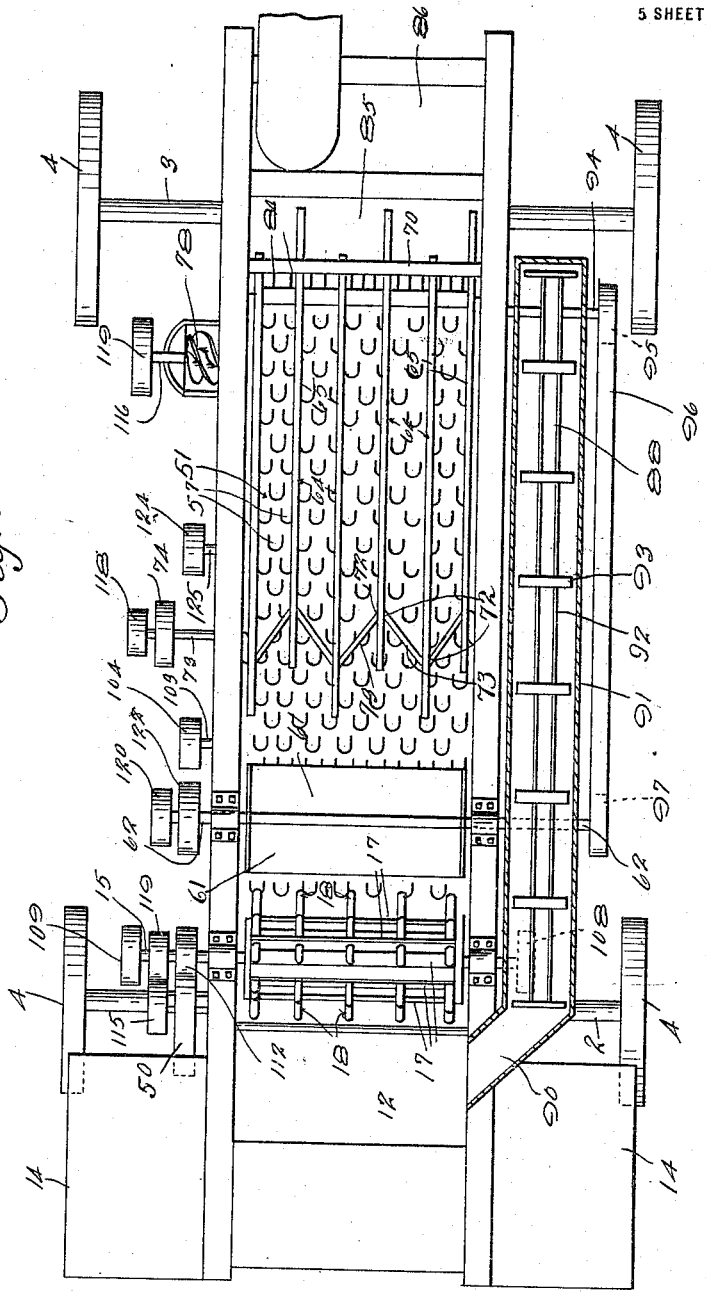

F. GEMINDEN & F. KIEL.
THRESHER OR SEPARATOR.
APPLICATION FILED JAN. 14, 1916.
1,229,063.
Patented June 5, 1917.
5 SHEETS—SHEET 4.
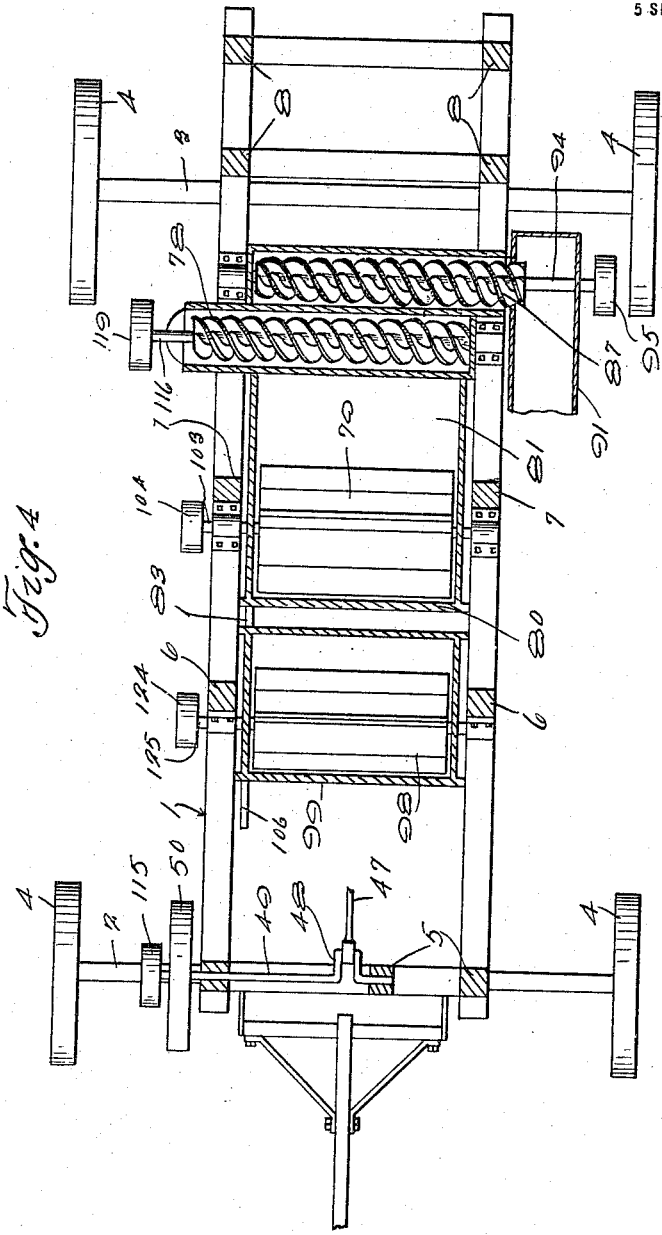
Witnesses
Chas. H. Trotter
Rob'd Meyer
Inventors
F. Geminden
& F. Kiel
By [signature]
Attorney F. GEMINDEN & F. KIEL.
THRESHER OR SEPARATOR.
APPLICATION FILED JAN. 14, 1916.
1,229,063.
Patented June 5, 1917.
5 SHEETS—SHEET 5.
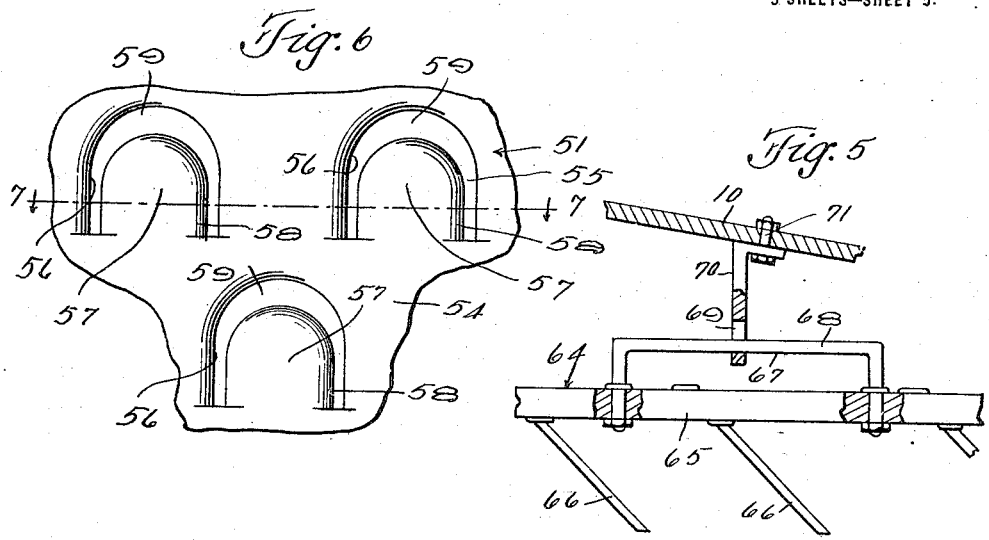
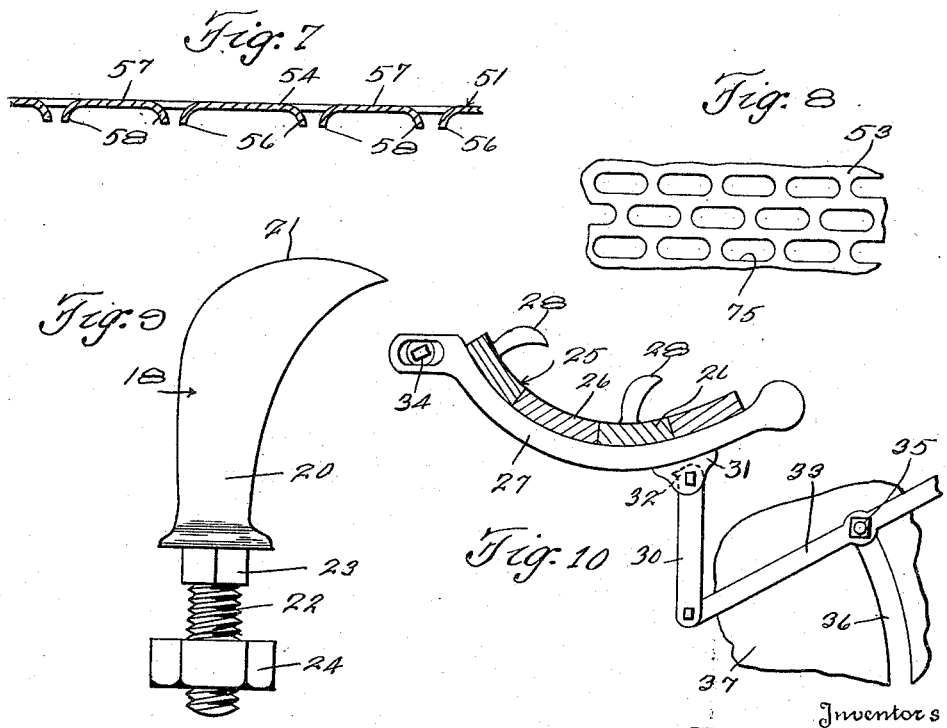
Witnesses
Chas. H. Trotter
Rohr Meyer
Inventors
F. Geminden
& F. Kiel
By [signature]
Attorney

UNITED STATES PATENT OFFICE.

FRANK GEMINDEN AND FRANK KIEL, OF MONITEAU COUNTY, MISSOURI.

THRESHER OR SEPARATOR.

1,229,063.     Specification of Letters Patent.     Patented June 5, 1917.

Application filed January 14, 1916. Serial No. 72,093.

*To all whom it may concern:*

Be it known that we, FRANK GEMINDEN and FRANK KIEL, citizens of the United States of America, residing in the county of Moniteau and State of Missouri, have invented certain new and useful Improvements in Threshers or Separators; and we do hereby declare the following to be a full, clear, and exact description of the invention, such as will enable others skilled in the art to which it appertains to make and use the same.

This invention relates to threshers, and more particularly to a thresher which is comparatively simple in construction, durable, and which embodies a plurality of adjustable parts, by means of which various types of agricultural products, such as grains, beans, peas, Kafir corn or the like may be threshed by the thresher.

A further object of this invention is to provide a thresher which includes a shaker pan to which a plurality of riddles are attached, through which riddles, the grain passes, during the threshing operation of the same.

Another object of this invention is to provide a top or initiative riddle, which extends horizontally within the thresher and forwardly to the concaves, so that the beaten grain will pass directly from the rotary threshing cylinder and the concaves upon the initiative riddle, and further to mount a rotary beater or feeder rearwardly of the cylinder for forcing the straw along the top of the initiative riddle.

Another object of this invention is to provide a plurality of vibratory toothed carriers which engage the straw and grain and carry it rearwardly over the top of the initiative riddle.

A further object of this invention is to provide a blast fan which has its outlet positioned beneath the secondary riddle for blowing a blast of air upwardly through the riddle for blowing or cleaning the grains and cleaning the riddles to insure the efficient operation of the latter.

A still further object of this invention is to provide means operable by the vibratory movement of the grain pan for regulating the direction of the air blast which is blown against the under surface of the first or initiative and second riddle.

A still further object of this invention is to provide a pair of auger conveyers positioned at the delivery end of the riddles, and to provide a dividing board which is constructed for leading the thoroughly threshed grain to one of the auger conveyers for delivery to sacks and to deliver the tailings to the other auger conveyer which delivers them to a tailings elevator for redeposit in the receiving end or mouth of the thresher for repassage through the same.

A still further object of this invention is to provide an air blast fan for cleaning the thoroughly threshed grain prior to its deposit in the delivery auger conveyer and also to provide slidable doors for controlling the air inlet openings of the fan, by means of which the intensity or strength of the air blast of the fans may be regulated.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved thresher.

Fig. 2 is a longitudinal section through the improved thresher.

Fig. 3 is a horizontal section through the thresher taken immediately below the top of the housing of the thresher.

Fig. 4 is a section through the thresher showing the blast fan and grain auger.

Fig. 5 is an enlarged detail of a part of the construction of the carrier.

Fig. 6 is a fragmentary plan view of the lip riddle.

Fig. 7 is a sectional view on the line 7—7 of Fig. 6.

Fig. 8 is a fragmentary detail of the sorting riddle.

Fig. 9 is a detail view of an improved form of cylinder tooth used on the thresher, and Fig. 10 is a detail of the concaves.

Referring more particularly to the drawings, 1 designates the supporting frame of the thresher which is mounted upon the ordinary front and rear axles 2 and 3, upon which supporting wheels 4 are mounted for portably supporting the thresher.

The supporting frame 1 has suitable standards 5, 6, 7 and 8 attached thereto as is ordinary in the construction of threshers and for forming the necessary support for the top 9 of the supporting frame and the housings which inclose the various working parts of the thresher.

The forward end of the housing 10 which incloses various of the working parts of the thresher is open, as is shown at 11, to form a feeding opening or mouth for the thresher. A feed board 12 is attached to the top sills 13 of the supporting frame or structure 1 and is provided for leading the grain into the mouth 11. Grain tables 14 are attached to the sills 13 and project upon each side of feed board 12.

A shaft 15 is rotatably supported within the housing 10 inwardly of the mouth 11. A beating or threshing cylinder 16 is mounted upon the shaft 15 for rotation therewith. The threshing or beating cylinder 16 is constructed in the ordinary manner, including a plurality of longitudinally extending slats 17 which are spaced about the circumference of the cylinder and have the cylinder teeth 18 attached thereto. The cylinder teeth 18 include the tooth body 20, the striking edge 21 of which is curved as clearly shown in Fig. 9, for eliminating the liability of the cracking or breaking of the grain when it is engaged by the cylinder. The teeth 18 have the ordinary type of screw threaded shank 22 and rectangular portion 23 of the shank which is seated in the slat 17 for preventing rotary movement of the teeth when they are attached to the slat by the screw threaded shank 22 and nut 24, which are mounted upon the shank.

The concaves 25 of the thresher are positioned beneath the threshing cylinder 16, as is ordinary in the construction of threshers, and they include plates 26 which extend transversely across the thresher. The concave plates or bars 26 are supported by suitable arcuate pivotally mounted arms 27, and if it is so desired, the alternate bars or plates 26 may have teeth 28 attached thereto, which are similar or identical in construction to the cylinder teeth 18 and attached to the plates or bars 26 in staggered relation to the cylinder teeth 18. The pivotally mounted concaved supporting arms 27 have arms 30 pivotally connected to depending ears 31 which are formed thereon. The arms 30 have heads 32, which engage the under edges of the pivoted arms 27. The arms 30 are in turn connected to levers 33. The levers 33 are connected to any suitable structure for rocking them for moving the arms 27 upon their pivotal support indicated at 34, for moving the concaves toward or away from the cylinder 16, which adjustment is necessary for the threshing of various types of agricultural products. The levers 33 have bolts 35 extending centrally therethrough, which bolts are seated in arcuate slots 36 formed in supporting blocks 37. By loosening the bolt 35 and moving it downwardly in the slot 36, the position of the lever 33 may be adjusted as necessary for properly adjusting the concaves with respect to the cylinder 16.

The grain pan 40 is positioned interiorly of the casing 10 and is supported by hangers 41 and 42. The hangers 41 and 42 are pivotally connected to the top sills 13 of the supporting structure 1 as is shown at 43 and they are also pivotally connected to cleats 44 which are attached to the under surface of the bottom of the grain pan 40 for permitting of a vibratory movement of the grain pan longitudinally of the thresher. The grain pan 40 has a relatively short shaft 47 connected thereto which is connected to a shaft 46 by a universal or ball and socket joint 45. The shaft or rod 46 is in turn connected to a crank portion 48 of a crank shaft 49. The crank shaft 49 is rotatably supported by the forward vertical standard 5 and it has a pulley 50 mounted thereon. The rotation of the crank shaft 49 will move the grain pan 40 in an oscillatory manner longitudinally of the housing or casing 10 of the thresher.

The grain pan 40 has riddles 51, 52 and 53 supported thereby. The riddles 51 and 52 are lip riddles, which are more clearly illustrated in Figs. 6 and 7 of the drawings. The lip riddles 51 and 52 include body plates 54, which are provided with openings 55, arranged in rows therein.

The edges of the openings 55 are rolled downwardly as is clearly shown at 56. Lips 57 project into the openings 55 and have their edges rolled downwardly as is shown at 58. The lips 57 are smaller than the opening 55, which leaves spaces 59 through which the threshed grain falls. By providing various sized openings or spaces 59, in the riddles, different types or kinds of grain or agricultural products may be threshed. The spaces 59 in the riddles 51 are larger than the spaces corresponding thereto which are formed in the riddle 52 and permit a limited quantity of the hulls of the grain or agricultural product being threshed to fall through the riddle 51 upon the riddle 52.

The riddle 51 is connected to the upper end of the rear side 60 of the grain pan 40 and extends in a horizontal plane to the inner end of the concave 26 so that the grain after it has been threshed or beaten between the cylinder 16 and the concave 26 will be thrown upon the riddle 51.

A rotary beater 61 is mounted upon a shaft 62, directly in the rear of the cylinder 16. The beater 61 has a plurality of radiating arms 63 which engage the grain after it has been thrown rearwardly by the beater or threshing cylinder 16, and throws it farther to the rear upon the surface of the riddle 51.

A plurality of carriers or beaters 64 are provided which include body bars 65 and a plurality of spaced angularly disposed teeth 66 which extend downwardly from the body bar 65 and incline toward the rear delivery end of the thresher. The rear ends of the body bars 65 have substantially U-shaped bolts 67 connected thereto, the bight portions 68 of which are seated in slots 69 formed in angled supporting plates 70. The angled supporting plates 70 are attached to the under surface of the top of the housing in any suitable manner, such as by bolts or analogous fastening devices indicated 71. The forward end of the body bars 65 of the carriers 64 are connected to the wrists 72 of a crank shaft 73. The crank shaft 73 is rotatably supported by the supporting structure 1 and has a pulley 74 mounted upon its outer end for rotating the shaft by the rotation of the pulley. The rotation of the crank shaft will cause the various carriers 64 to move in a reciprocatory and oscillatory movement for engaging the straw and grain and carrying it rearwardly over the upper surface of the riddle 51. The threshed and partially threshed grain will fall downwardly through the openings 59 in the riddle 51, upon the riddle 52. The sizes of the openings 59 in the riddle 52 are such as to permit only the threshed grain to fall therethrough, and this grain falls upon the riddle 53. The riddle 53 is provided with a plurality of openings 75 which are smaller than the size of the threshed grain. The openings 75 are provided for permitting the broken and imperfect grains to fall therethrough upon the inclined portion 76 of the bottom of the grain pan 40, while the perfect grains travel over the upper surface of the riddle 53 off the rear end of the same against the guiding board 77, which guides them downwardly to an auger conveyer 78 which in turn delivers them to sacks, or a measure to one side of the thresher.

A rotary air blast fan 79 is carried by the supporting structure 1 and the casing 80 of the same has an outlet chute 81 formed thereon which extends upwardly and guides the outgoing blast of air against the guiding boards 77, and upwardly through the space between the end of the riddle 53 and the guiding board 77 for cleaning the grains and blowing small particles of chaff, dust or the like from the grains prior to their deposit in the auger conveyer 78. The fan casing 80 has an inlet opening 82 formed in one end of the same, the size of which is regulated by a sliding door 83. By regulating the size of the inlet opening 82, the force of the air blast created by the rotation of the fan 79 may be regulated.

The straw travels off the end of the riddle 51, upon a plurality of spaced fingers 84, which incline downwardly at a relatively small angle, and falls from the fingers 84 upon the downwardly inclined platform 85 which leads the straw to the blower or stacker structure 86. Any suitable type of blower or stacker structure 86 may be employed, without departing from the spirit of this invention, as the same forms no part of the novel features of the thresher.

The fingers 84 are spaced so as to permit heads of grain, pods which have not been thoroughly threshed to fall downwardly into an auger conveyer 87, which carries them transversely of the thresher and delivers them to the tailings elevator 88. The tailings or partially threshed grains which will not pass through the openings 59 of the riddle 52 pass off the end of this riddle and are guided downwardly to the auger conveyer 87 by an inclined guiding board 89 and the board 60. The tailings which are guided to the conveyer 87 are delivered to the tailing elevator 88 which is positioned to one side of the thresher and it elevates the tailings and delivers them to a chute 90 which in turn deposits the tailings upon the feed board 12 for repassage through the thresher. The tailing elevator 88 travels in a housing 91, and it comprises endless belts or sprockets 92 which have flights 93 attached thereto at spaced intervals for engaging the tailings and elevating them to the trough or chute 90. The tailings conveyer or elevator 88 is operated by the rotation of a shaft 94 which has a pulley 95 mounted thereon about which a belt 96 travels. The belt 96 also travels about the pulley 97 which is mounted upon the shaft 62.

A rotary air blast fan 98 is carried by the supporting structure 1 and is mounted within a fan casing 99. The outlet of the air from the fan casing 99 is guided by a spout 100 which causes the air to strike the riddle 52 from the under side and blow upwardly through this riddle and the riddle 51, for partially cleaning the grain during the threshing of the same. A foraminous screen 101 is connected to the grain pan 40 and extends across a portion of the pan above the outlet of the spout 100. The foraminous screen is provided for preventing chaff, or grain from falling downwardly within the fan casing.

An air guiding board 102 is hingedly connected as is shown at 103 to a portion of the grain pan 40 and it rides over one edge of the spout 100. The air blast guiding board 102 swings upon its hinged support 103 during the vibratory movement of the grain pan 40 for guiding the blast of air which issues from the spout 100. As the grain pan 40 moves forward, the hinged board 102 lowers, throwing the air blast from the fan 98 to the rear of the riddles, and as the grain pan 40 moves rearward, the air blast guiding board 102 will rise throwing the air blast along the lower side of the riddle toward the front for properly guiding the air blast through the riddles for efficiently aiding in the cleaning of the grain.

The fan casing 99 has an inlet opening 105, the size of which is regulated by a slidable door 106 for regulating the inlet of air into the fan, and consequently regulating the air blast forced from the pan.

The cracked or imperfect grains which fall through the openings 75 of the riddle 53 upon the inclined portion 76 of the shaker pan 40 travel downwardly over the upper surface of the inclined portion 76 into a trough 107 which extends transversely across the thresher and delivers the cracked and imperfect grains to one side of the thresher.

The power is transmitted from any suitable type of prime mover, to the shaft 15, upon which the cylinder 16 is mounted, through the medium of a pulley 108, which is mounted upon the shaft 15. The shaft 15 has a pulley 109 mounted thereon, about which a twisted belt 110 travels. The belt 110 travels about the pulley 111 which is used for propelling the blower fan used in connection with the blower or stacker 86. A third pulley 112 is mounted on the shaft 16, and a belt 113 passes about this pulley and the pulley 50 which is mounted upon the crank shaft 49. The power is transmitted from the crank shaft 49 to the crank shaft 73 through the medium of a belt 114, which travels about the pulley 115 which is mounted upon the crank shaft 49 and the pulley 74 which is mounted on the crank shaft 73. Power is transmitted from the crank shaft 73 to the shaft 116 which operates the auger conveyer 78, through the medium of a belt 117 which travels about a pulley 118 mounted upon the crank shaft 73 and a pulley 119 mounted upon the auger shaft 116.

The beater 61 is driven by the shaft 15, through the medium of a belt 118 which travels about a pulley 119 which is mounted upon the shaft 15 and a pulley 120 which is mounted upon the shaft 62. The fans 79 and 98 are driven by a belt 121 which belt travels about a pulley 122 mounted upon the shaft 62, about an idler 123, which is rotatably supported by the supporting structure 1, about the pulley 124 which is mounted upon the shaft 125 of the fan 79, and about the pulley 124 which is mounted upon the shaft 125 of the fan structure 98 from whence it returns to the pulley 123.

A platform 130 is suspended by flexible supports or hangers 131 beneath the grain boards 14, and is provided for supporting the feeder of the thresher.

Concisely, the operation of the improved thresher is as follows:

The grains or agricultural products to be threshed are passed through the mouth 11 into the thresher and they are engaged by the beating or threshing teeth 18 of the cylinder 16, which is rotating at a relative high rate of speed. The cylinder 16 will thresh the grains or agricultural products, forcing them rearwardly in the machine over the concaves 26, upon the upper surface of the riddle 51. The beater 61 will engage the grain after it has been beaten or partially threshed by the cylinder 16 and throw it rearwardly over the upper surface of the riddle 51. The grain is further moved rearwardly over the upper surface of the riddle 51 by the operation of the carriers 64. The seed or kernels of the grain which is beaten from the pods or heads thereof will fall through the openings or spaces 59 in the riddle 51 upon the upper surface of the riddle 52 and through the spaces 59 formed in the riddle 52 upon the slotted riddle 53. The riddles 51, 52 and 53 being carried by the grain pan 40 will move in a vibratory manner longitudinally of the thresher, continuously during the operation of the same which vibratory movement will assist in shaking the threshed grains or kernels through the spaces in the respective riddle. The perfect grains or seeds will travel over the upper surface of the riddle 53 and off the rear end of the same, from whence they will fall into the casing which retains the auger conveyer 78. The threshed grain will be delivered by the auger conveyer 78 to sacks, measures or any other desired construction. The tailings or partially threshed kernels or grains will be delivered to the auger conveyer 87, which will deliver them to the tailings elevator 88, which will in turn deliver the tailings to the mouth 11 of the thresher for repassage through the latter. The broken and imperfect kernels or grains will fall through the slot 75 in the riddle 53 upon the inclined portion 76 of the grain pan 40 and pass outwardly through the trough 107. The operation of the fans 79 and 98 will by blowing the blast of air through the riddles and upwardly through the machine clean the grain, and blow free from the kernels or seeds, small particles of straw, chaff, dust or the like. The straw, from which the kernels or grains have been threshed passes over the guiding board 85 into the blower or stacker 86 from which it is blown in the ordinary manner.

From the foregoing description taken in connection with the accompanying drawings the advantages of construction and of the method of operation of the improved thresher or separator will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a thresher, the combination, of a vibratory grain pan, a plurality of riddles carried by said grain pan and movable therewith, an air blast fan positioned below said riddles and having its outlet arranged for blowing a blast of air upwardly through the riddles, an air blast guiding board hingedly carried by said grain pan and engaging the outlet of said fan for directing the passage of the air blast through said riddles, said board operable upon movement of said grain pan for changing the direction of the air blast.

2. In a thresher, the combination, of a vibratory grain pan, a plurality of riddles carried by said grain pan and movable therewith, said riddles being arranged in vertical spaced relation to each other, the two uppermost riddles being constructed for separating grain from straw, the lowermost riddle being constructed for sorting grain, means positioned beneath said sorting riddle for receiving the imperfect grain therefrom, a conveyer positioned beneath the delivery end of said sorting riddle, a guiding board for guiding the perfect grain from said sorting riddle and the lowermost of the said separating riddles to said conveyer, means for blowing a cleaning blast of air about said grain during travel from said riddles to said conveyer, means positioned beneath said riddles for blowing a blast of air upwardly through said separating riddles, means operable by the vibratory movement of said grain pan for regulating the direction of travel of the air blast from said last named means.

3. In a thresher, the combination, of a vibratory grain pan, a plurality of riddles carried by said grain pan and movable therewith, said riddles arranged in vertical spaced relation, the two uppermost riddles being constructed for separating grain from straw, a plurality of spaced fingers positioned for receiving straw from the uppermost of said riddles, a conveyer positioned beneath said fingers for receiving unthreshed grain heads and delivering them to a tailings conveyer.

4. In a thresher, the combination, of a vibratory grain pan, a plurality of riddles carried by said pan and movable therewith, said riddles arranged in vertical spaced relation, the two uppermost riddles being constructed for separating grain from straw, a plurality of spaced fingers positioned for receiving straw from the uppermost of said riddles, a conveyer positioned beneath said fingers for receiving unthreshed grain heads therefrom and delivering them to a tailings elevator, an inclined guiding board leading from the delivery end of the second uppermost riddle to said conveyer for guiding tailings from the second riddle to the conveyer.

5. In a thresher, the combination, of a vibratory grain pan, a plurality of riddles carried by said pan and movable therewith, said riddles arranged in vertical spaced relation, the two uppermost riddles being constructed for separating grain from straw, a plurality of spaced fingers positioned for receiving straw from the uppermost of said riddles, a conveyer positioned beneath said fingers for receiving unthreshed grain heads from the fingers and delivering them to a tailings elevator, an inclined guiding board leading from the delivery end of the second uppermost riddle to said conveyer for guiding tailings from the second riddle to the conveyer, a second conveyer positioned forwardly of first named conveyer, and a second guiding board positioned for guiding threshed grain from the second riddle to said second named conveyer.

6. In a thresher, the combination, of a vibratory grain pan, a plurality of riddles carried by said pan and movable therewith, said riddles arranged in vertical spaced relation, the two uppermost riddles being constructed for separating grain from straw, a plurality of spaced fingers positioned for receiving straw from the uppermost of said riddles, a conveyer positioned beneath said fingers for receiving unthreshed grain heads from the fingers and delivering them to a tailings elevator, an inclined guiding board leading from the delivery end of the second uppermost riddle to said conveyer for guiding tailings from the second riddle to the conveyer, a second conveyer positioned forwardly of first named conveyer, and a second guiding board positioned for guiding threshed grain from the second riddle to said second named conveyer, and an air blast fan having its outlet positioned for blowing a blast of air through the threshed grain during its passage to the second conveyer.

7. In a thresher, the combination, of a vibratory grain pan, a plurality of riddles carried by said pan and movable therewith, said riddles arranged in vertical spaced relation, the two uppermost riddles being constructed for separating grain from straw, a plurality of spaced fingers positioned for receiving straw from the uppermost of said riddles, a conveyer positioned beneath said fingers for receiving unthreshed grain heads from the fingers and delivering them to a tailings elevator, an inclined guiding board leading from the delivery end of the second uppermost riddle to said conveyer for guiding tailings from the second riddle to the conveyer, a second conveyer positioned forwardly of first named conveyer, and a second guiding board positioned for guiding threshed grain from the second riddle to said second named conveyer, an air blast fan having its outlet positioned for blowing a blast of air through the threshed grain during its passage through the second conveyer, and means for regulating the quantity of the air blast.

8. In a thresher, the combination, of a vibratory grain pan, a plurality of riddles carried by said pan and movable therewith, said riddles arranged in vertical spaced relation, the two uppermost riddles being constructed for separating grain from straw, a plurality of spaced fingers positioned for receiving straw from the uppermost of said riddles, a conveyer positioned beneath the fingers for receiving unthreshed grain heads from the fingers and delivering them to a tailings elevator, an inclined guiding board leading from the delivery end of the second uppermost riddle to said conveyer for guiding tailings from the second riddle to the conveyer, a second conveyer positioned forwardly of said first named conveyer, a second guiding board positioned for guiding threshed grain from the second riddle to the second conveyer, means positioned beneath said riddle for blowing a blast of air upwardly through said separating or uppermost riddles, means for regulating the direction of travel of the air blast from said last named means.

9. In a thresher, the combination, of a vibratory grain pan, a plurality of riddles carried by said grain pan and movable therewith, said riddles arranged in vertical spaced relation, the two uppermost riddles positioned for separating grain from straw, a plurality of spaced fingers positioned for receiving straw from the uppermost of said riddles, a conveyer positioned beneath said fingers for receiving unthreshed grain from the fingers and delivering them to a tailing elevator, an inclined guiding board leading from the delivery end of the second uppermost riddle to said conveyer for guiding tailings from the second riddle to the conveyer, a second conveyer positioned forwardly of said first named conveyer, a second guiding board positioned for guiding threshed grain from said riddle to said second conveyer, the lowermost riddle being constructed for sorting grain, said second guiding board being arranged for guiding the perfect grain from the lowermost riddle to said second conveyer.

10. In a thresher, the combination, of a vibratory grain pan, a plurality of riddles carried by said grain pan and movable therewith, said riddles arranged in vertical spaced relation, the two uppermost riddles positioned for separating grain from straw, a plurality of spaced fingers positioned for receiving straw from the uppermost of said riddles, a conveyer positioned beneath said fingers for receiving unthreshed grain from the fingers and delivering them to a tailings elevator, an inclined guiding board leading from the delivery end of the second uppermost riddle to said conveyer for guiding tailings from the second riddle to the conveyer, a second conveyer positioned forwardly of said first named conveyer, a second guiding board positioned for guiding threshed grain from said riddle to said second conveyer, the lowermost riddle being constructed for sorting grain, said second guiding board being arranged for guiding the perfect grain from the lowermost riddle to said second conveyer, an air blast fan having its outlet positioned for blowing a blast of air through the threshed grain during its passage to the second conveyer.

11. In a thresher, the combination, of a vibratory grain pan, a plurality of riddles carried by said pan and movable therewith, said riddles arranged in vertical spaced relation, the two uppermost riddles being constructed for separating grain from straw, a plurality of spaced fingers positioned for receiving straw from the uppermost of said riddles, a conveyer positioned beneath said fingers for receiving unthreshed grain heads from the fingers and delivering them to a tailings elevator, an inclined guiding board leading from the delivery end of said second uppermost riddle to said conveyer for guiding tailings from the second riddle to the conveyer, a second conveyer positioned forwardly of said first named conveyer, a second guiding board positioned for guiding threshed grain from the second riddle to said second conveyer, said riddle being constructed for sorting grain, said second guiding board being arranged for guiding the perfect grain from the lowermost riddle to said second conveyer, a trough positioned beneath said lowermost riddle, the bottom of said grain pan beneath said lowermost riddle, inclining to said trough for guiding imperfect grain into the trough.

12. In a thresher, the combination, of a vibratory grain pan, a plurality of riddles carried by said pan and movable therewith, said riddles arranged in vertical spaced relation, the two uppermost riddles being constructed for separating grain from straw, a plurality of spaced fingers positioned for receiving straw from the uppermost of said riddles, a conveyer positioned beneath said fingers for receiving unthreshed grain heads from the fingers and delivering them to a tailings elevator, an inclined guiding board leading from the delivery end of said second uppermost riddle to said conveyer for guiding tailings from the second riddle to the conveyer, a second conveyer positioned forwardly of said first named conveyer, a second guiding board positioned for guiding threshed grain from the second riddle to said second conveyer, said riddle being constructed for sorting grain, said second guiding board being arranged for guiding the perfect grain from the lowermost riddle to said second conveyer, a trough positioned beneath said lowermost riddle, the bottom of said grain pan beneath said lowermost riddle, inclining to said trough for guiding imperfect grain into the trough, and an air blast fan having its outlet positioned for blowing a blast of air through the threshed grain during its passage to the second conveyer.

13. In a thresher, the combination, of a vibratory grain pan, a plurality of riddles carried by said grain pan and movable therewith, said riddles arranged in vertical spaced relation, the two uppermost riddles being positioned for separating grain from straw, the lowermost riddle being constructed for sorting grain, an air blast fan, said fan having its outlet positioned for blowing a blast of air above said lowermost riddle and through the two uppermost riddles, and a foraminous screen attached to the lowermost riddle and the one next thereabove for preventing chaff from entering the fan casing.

14. In a thresher, the combination, of a vibratory grain pan, a plurality of riddles carried by said grain pan and movable therewith, said riddles arranged in vertical spaced relation, the two uppermost riddles being constructed for separating grain from straw, the lowermost riddle being constructed for sorting grain, an air blast fan, said fan having its outlet positioned for blowing a blast of air above said lowermost riddle and through the two uppermost riddles, a foraminous screen attached to the lowermost riddle and the riddle next thereabove for preventing chaff from entering the fan casing, and means for changing the direction of the air blast.

15. In a thresher, the combination, of a vibratory grain pan, a plurality of riddles carried by said grain pan and movable therewith, said riddles arranged in vertical spaced relation, the two uppermost riddles being constructed for separating grain from straw, the lowermost riddle being constructed for sorting grain, a conveyer positioned beneath said riddles, a guiding board positioned for guiding threshed grain from the second of said uppermost riddles to said conveyer, said guiding board being arranged for guiding the perfect grain from the lowermost riddle to the conveyer.

16. In a thresher, the combination, of a vibratory grain pan, a plurality of riddles carried by said grain pan and movable therewith, said riddles arranged in vertical spaced relation, the two uppermost riddles being constructed for separating grain from straw, the lowermost riddle being constructed for sorting grain, a conveyer positioned beneath said riddles, a guiding board positioned for guiding threshed grain from the second of said uppermost riddles to said conveyer, said guiding board being arranged for guiding the perfect grain from the lowermost riddle to the conveyer, an air blast fan having its outlet positioned for blowing a blast of air through the threshed grain during its passage to said conveyer.

17. In a thresher, the combination, of a vibratory grain pan, a plurality of riddles carried by said grain pan and movable therewith, said riddles arranged in vertical spaced relation, the two uppermost riddles being constructed for separating grain from straw, the lowermost riddle being constructed for sorting grain, a conveyer positioned beneath said riddles, a guiding board positioned for guiding threshed grain from the second of said uppermost riddles to said conveyer, said guiding board being arranged for guiding the perfect grain from the lowermost riddle to the conveyer, an air blast fan, said fan having its outlet positioned for blowing a blast of air above said lowermost riddle and through the two uppermost riddles, a foraminous screen attached to the lowermost riddle and the one next thereabove for preventing chaff from entering the fan casing.

18. In a thresher, the combination, of a vibratory grain pan, a plurality of riddles carried by said grain pan and movable therewith, said riddles arranged in vertical spaced relation, the two uppermost riddles being constructed for separating grain from straw, the lowermost riddle being constructed for sorting grain, a conveyor positioned beneath said riddles, a guiding board positioned for guiding threshed grain from the second of said uppermost riddles to said conveyer, said guiding board being arranged for guiding the perfect grain from the lowermost riddle to the conveyer, an air blast fan, said fan having its outlet positioned for blowing a blast of air above said lowermost riddle and through the two uppermost riddles, a foraminous screen attached to the lowermost riddle and the one next thereabove for preventing chaff from entering the fan casing, and means for changing the direction of the air blast.

19. In a thresher, the combination, of a vibratory grain pan, a plurality of riddles carried by said grain pan and movable therewith, said riddles arranged in vertical spaced relation, the two uppermost riddles being constructed for separating grain from straw, the lowermost riddle being constructed for sorting grain, a conveyer positioned beneath said riddles, a guiding board positioned for guiding threshed grain from the second of said uppermost riddles to said conveyer, said guiding board being arranged for guiding the perfect grain from the lowermost riddle to the conveyer, an air blast fan, said fan having its outlet positioned for blowing a blast of air above said lowermost riddle and through the two uppermost riddles, a foraminous screen attached to the lowermost riddle and the one next thereabove for preventing chaff from entering the fan casing, and means for changing the direction of the air blasts, and a trough positioned beneath said lowermost riddle, the bottom of said grain pan beneath said lowermost riddle inclining to said trough for guiding imperfect grain into the trough.

In testimony whereof we affix our signatures in presence of two witnesses.

FRANK GEMINDEN.
FRANK KIEL.

Witnesses:
L. F. WOOD,
ROY L. KAY.

Copies of this patent may be obtained for five cents each, by addressing the "Commissioner of Patents, Washington, D. C."